United States Patent [19]
LoCicero et al.

[11] Patent Number: 4,631,574
[45] Date of Patent: Dec. 23, 1986

[54] COMPATIBLE HIGH-DEFINITION TELEVISION WITH EXTENDED ASPECT RATIO

[75] Inventors: Joseph L. LoCicero, Riverside; Melih Pazarci, Chicago; Theodore S. Rzeszewski, Lombard, all of Ill.

[73] Assignee: AT&T Bell Laboratories, Murray Hill, N.J.

[21] Appl. No.: 626,453

[22] Filed: Jun. 29, 1984

[51] Int. Cl.[4] .................. H04N 11/06; H04N 7/06
[52] U.S. Cl. .................... 358/12; 358/141; 358/14
[58] Field of Search .............. 358/12, 141, 14

[56] References Cited

U.S. PATENT DOCUMENTS

| | | | |
|---|---|---|---|
| 2,686,831 | 8/1954 | Dome | 358/141 |
| 3,617,626 | 11/1971 | Bluth | 358/11 |
| 4,296,431 | 10/1981 | Holland | 358/12 |
| 4,300,161 | 11/1981 | Haskell | 359/142 |
| 4,551,754 | 11/1985 | Merse et al. | 358/180 |
| 4,564,857 | 1/1986 | LoCicero et al. | 358/11 |

FOREIGN PATENT DOCUMENTS

| | | | |
|---|---|---|---|
| 8300269 | 1/1983 | Int'l Pat. Institute | 358/12 |
| 2132444 | 7/1984 | United Kingdom | 358/141 |

OTHER PUBLICATIONS

Jackson et al, "System Concepts in High Fidelity Television", International Broadcasting Convention, Sep. 1982, pp. 135–139.

Apple et al, "Data Compression for High Definition TV:An NTSC Computable Approach", Procedings of the 1982 National Telecommunications Conference, Nov. 1982.

"Compatible Systems for High–Quality Television", SMPTE J., R. N. Jackson and M. J. J. C. Annegarn, vol. 92, No. 7, pp. 719–723, Jul. 1983.

"Extended Definition Television with High Picture Quality", SMPTE J., B. Wendland, vol. 92, No. 10, pp. 1028–1035, Oct. 1983.

"The Problems and Promises of High–Definition Television", IEEE Spectrum, R. K. Jurgen, vol. 20, No. 12, pp. 46–51, Dec., 1983.

"An Evolutionary Approach to High Definition Television", in Proc. 16th Annual SMPTE Television Conference (Tommorrow's Television), C. W. Rhodes, pp. 186–197, Feb., 1982.

"A Compatible High Fidelity TV Standard for Satellite Broadcasting", in Proc. 16th Annual SMPTE Television Conference (Tomorrow's Television), T. W. Robson, pp. 218–236, Feb., 1982.

"High Definition Television Systems: Desirable Standards, Signal Forms, and Transmission Systems", IEEE Trans. Comm., T. Fujio, vol. COM-29, No. 12, pp. 1882–1890, Dec., 1981.

"A Study of High–Definition TV System in the Future", T. Fujio, IEEE Trans. on Brdcstg., 12/78, vol. BC-24, No. 4, pp. 92–100.

"Present Situation of Japanese Satellite Broadcasting for Experimental Purpose", T. Ishida, et al. IEEE Trans. on Brdcstg. 12/79, vol. BC-25, No. 4, pp. 105–112.

"A Universal Weighted Power Function of Television Noise & Its Application to High Definition TV System Design", T. Fujio, IEEE Trans. on Brdcstg., 6/80, vol. BC-26, No. 2, pp. 39–47.

Primary Examiner—John W. Shepperd
Attorney, Agent, or Firm—John C. Moran

[57] ABSTRACT

A television (TV) system having a fully compatible high-definition signal with extended aspect ratio information receivable at conventional resolution by conventional TV receivers without auxiliary apparatus with one TV channel carrying the conventional TV signal while high-frequency luminance and chrominance information plus extended aspect ratio information are provided in a second TV channel. The television system uses a video camera that produces the Y, I, and Q video signals with a bandwidth of 9.4 megahertz (MHz). These, Y, I, and Q signals have already been line decimated to 525 lines per frame with a scan rate of the standard 15.7 kiloherts (kHz). The resulting 63.5 microseconds line scan time comprises 42 microseconds of center information and 10.5 microseconds of edge information with 11 microseconds being allowed for the blanking and synchronization interval. The low-frequency center luminance and chrominance information is first time expanded and inserted into the first channel, and the high-frequency center chrominance and luminance information is time expanded and inserted into the second channel. The extended aspect ratio chrominance and luminance information is contained within the edge information and is transmitted during the horizontal retrace interval in the second TV channel.

23 Claims, 11 Drawing Figures

COMPATIBLE HIGH-DEFINITION TELEVISION WITH EXTENDED ASPECT RATIO

CROSS-REFERENCE TO RELATED APPLICATIONS

The following U.S. application was filed on Feb. 28, 1984 and assigned to the same assignees as this application: LoCicero-Pazarci-Rzeszewski 1-1-4, "Aspect Ratio Improvement for Compatible High-Definition Television", Ser. No. 584,526, now U.S. Pat. No. 4,564,857.

The following U.S. application was filed on Feb. 23, 1984, and assigned to the same assignees as this application: T. S. Rzeszewski 5, "Fully Compatible High Definition Television," Ser. No. 583,099.

The following U.S. applications were filed on Jan. 16, 1984 and assigned to the same assignees as this application: T. S. Rzeszewski 2, "Single Sideband Modulated Chrominance Information for Compatible High-Definition Television", Ser. No. 571,117; and T. S. Rzeszewski 3, "Time Multiplexing Chrominance Information for Compatible High-Definition Television", Ser. No. 571,183.

The following U.S. application was filed on Jan. 28, 1983 and assigned to the same assignees as this application: T. S. Rzeszewski 1, "Fully Compatible High-Definition Television", Ser. No. 462,065, now abandoned.

TECHNICAL FIELD

This invention relates to a system for improving television picture quality and particularly to encoding and decoding facilities for use in a system that provides an improved aspect ratio to specially designed receivers and a signal of usual quality to conventional receivers without alteration.

BACKGROUND OF THE INVENTION

The aspect ratio defines the ratio of the width of a picture to its height. The aspect ratio of a commercial movie theater's screen is at least five to three, and the conventional U.S. television picture, as specified by the National Television Standards Committee (NTSC) is four to three. The difference between aspect ratios of a conventional television picture and commercial movie theater results in the loss of picture information when movies originally produced for viewing on a commercial movie theater screen are later transmitted for display on a conventional television set, since the television set is incapable of displaying all the information present in the original movie theater picture. Another problem that arises because of the four to three aspect ratio of conventional television is that certain production techniques make advantageous use of a wider screen for displaying scenes at a distance. In general, such production techniques require a higher definition picture than that is presently available in conventional television.

An approach to providing high-definition television that could be received as a conventional television picture by conventional television receivers operating according to the NTSC standard or could be received as a high-definition television picture by newly designed receivers without requiring prohibitively large bandwidth is disclosed in an article entitled, "A Compatible High-Definition Television System", by T. S. Rzeszewski, *The Bell System Technical Journal,* Vol. 62, No. 7, September, 1983, pp. 2091-2111. In that system, one 6 megahertz (MHz) television channel carries the conventional information while the high-frequency luminance and high-frequency chrominance information are provided in a second 6 MHz television channel. That system has an aspect ratio of four to three. Whereas, for many applications the aspect ratio of four to three is suitable, there exists applications for which a greater aspect ratio is desired.

Therefore, there exists a need for a high-definition television system that is compatible with standard NTSC systems but that can also provide improved aspect ratio information without requiring a greater bandwidth than that provided by two television channels.

SUMMARY OF THE INVENTION

The foregoing problems are solved and a technical advance is achieved in accordance with the principles of this invention incorporated in a structural embodiment in which high-definition television picture signals with improved aspect ratio information are provided that can be received on conventional television sets and that can be received on modified receivers by the utilization of two conventional broadcast television channels. Advantageously, a high-definition baseband signal with extended aspect ratio information from a video source is transmitted via conventional television channels by first time expanding low-frequency luminance and chrominance information for transmission in one channel as a conventional television signal and by time expanding high-frequency luminance and chrominance information for transmission in the second channel. The latter information defines a high-definition picture with an aspect ratio analogous to the conventional television picture. Advantageously, the additional aspect ratio information is transmitted during the horizontal retrace interval of the second television channel relying on the conventional television channel to provide horizontal synchronization information for both television channels.

In addition, the high-frequency chrominance information comprises $I_H$ and $Q_H$ segments that are transmitted in alternate active horizontal intervals. Also, the extended aspect ratio chrominance information comprises $I_e$ and $Q_e$ segments that are quadrature amplitude modulated by a signal having a frequency that is a multiple of the frequency of the line scan frequency before insertion into the horizontal retrace interval of the second channel. Advantageously, the extended aspect ratio luminance information and the extended aspect ratio chrominance information are multiplexed and alternately inserted into the horizontal retrace interval of the second channel in order to avoid crosstalk problems between these two types of information.

Advantageously, a television receiver designed in accordance with our invention decodes the information transmitted in the television channels by first decoding the low-frequency luminance and chrominance information using standard techniques and also by decoding the high-frequency luminance and chrominance information from the second channel and then by time compressing the decoded low-frequency and high-frequency luminance and chrominance information. In addition, the receiver is responsive to the extended aspect ratio information transmitted during the horizontal retrace interval of the second channel to gate the extended aspect ratio luminance and chrominance information from that channel so that it can be filtered and properly translated in frequency. The receiver then combines the time compressed low-frequency luminance and chrominance information and the time compressed high-frequency luminance and chrominance information with the processed extended aspect ratio luminance and chrominance information for purposes of display.

Advantageously, the receiver is responsive to the alternate transmission of extended aspect ratio luminance information and extended aspect ratio chrominance information in the horizontal retrace interval of the second channel to decode this information and to provide storage so that continuous extended aspect ratio luminance and chrominance information is provided for display.

BRIEF DESCRIPTION OF THE DRAWING

In general, system elements, when first introduced on a figure, are each designated with a number that uses the figure number as the most significant digits of the element number.

DETAILED DESCRIPTION

Figure 1:
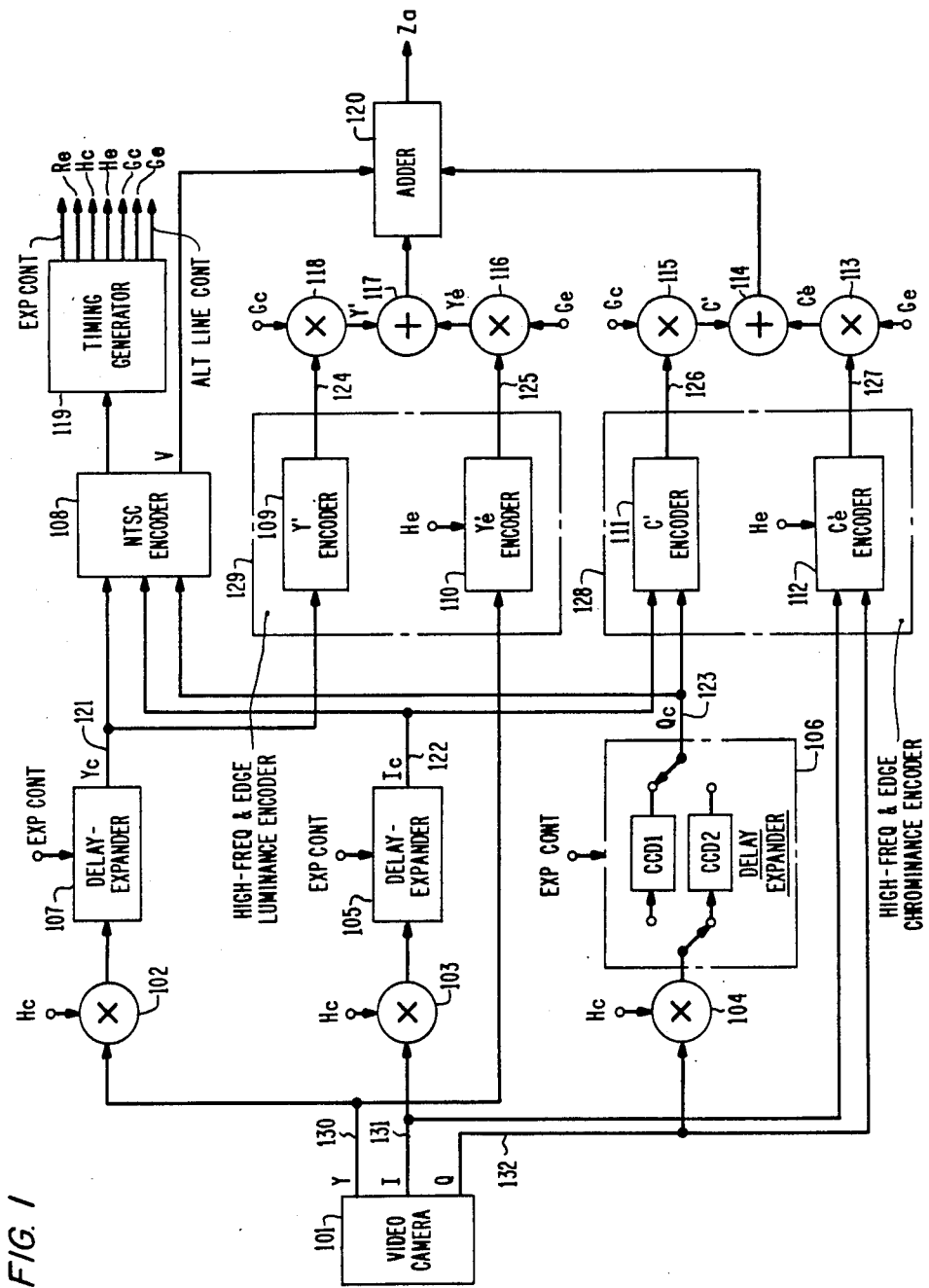
FIG. 1 is a block diagram of the high-definition encoder of our invention.
Figure 2:
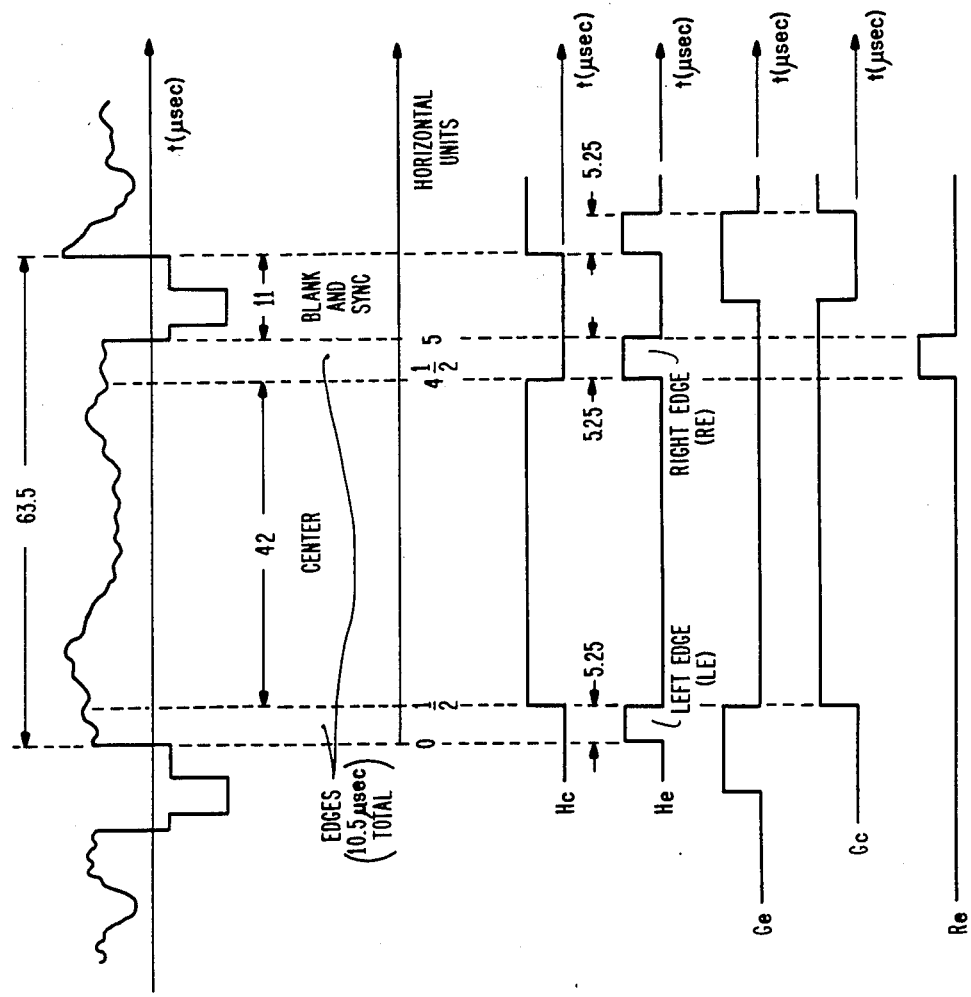
FIG. 2 shows a video signal illustratively capable of providing an aspect ratio of five to three with a 63.5 microsecond horizontal interval and related gating control signals.

The following describes a television system that is fully compatible with conventional NTSC receivers and also capable of displaying high resolution and extended aspect ratio television pictures on the system's specially designed receivers. An encoding system for producing the high-definition television signal with extended aspect ratio is illustrated in FIG. 1. Video camera 101 produces Y, I, and Q signals that have a bandwidth of 9.4 MHz. These Y, I, and Q signals have already been line decimated to 525 lines per frame with a scan rate of the NTSC standard 15.7 kilohertz (kHz). As illustrated in FIG. 2, the resulting 63.5 microsecond line scan time comprises 42 microseconds of center information and 10.5 microseconds of edge information with 11 microseconds being allowed for the blanking and synchronization interval. The format of the resulting displayed picture from these signals has an aspect ratio of five to three where each unit along the horizontal time base requires 10.5 microseconds of scan time. The center interval is defined in FIG. 2 by the middle control signal, $H_c$, and the edge intervals are defined by the $H_e$ signal. The encoder circuit of FIG. 1 is responsive to the Y, I, and Q signals during the center information time to delay the Y, I, and Q signals by one horizontal line scan time, and to expand the 42 microseconds of information into 52.5 microseconds, and to encode this information into two TV channels. The edge information illustrated in FIG. 2 is encoded and inserted into the blanking interval of the second channel during the time defined by the edge control signal, $G_e$, of FIG. 2.

Figure 3:
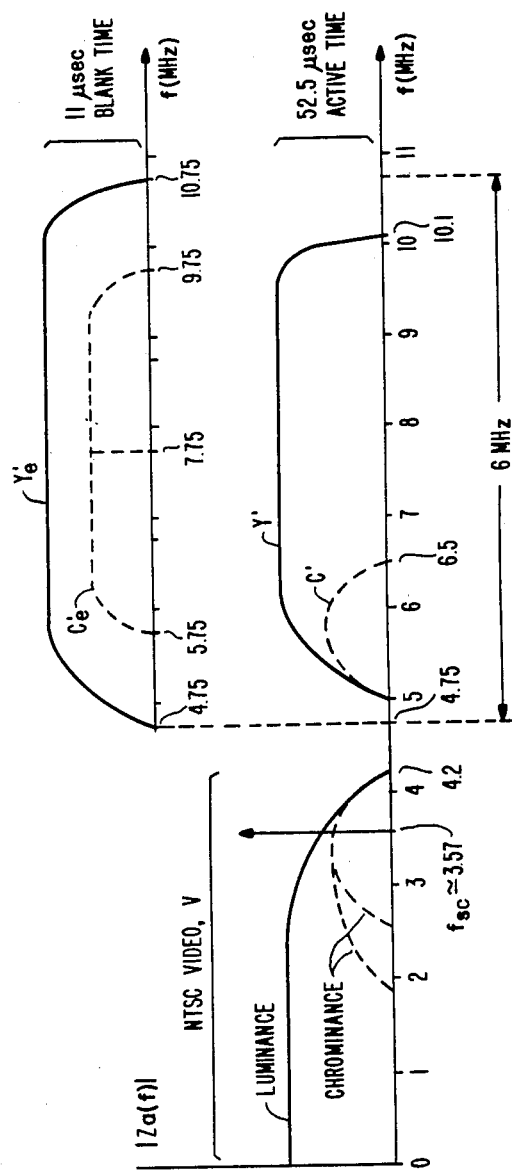
FIG. 3 shows the composite baseband amplitude-frequency characteristics of the signal generated by the encoder illustrated in FIG. 1.

The low-frequency luminance and chrominance information in the first TV channel is encoded in the NTSC format in the following manner. The center luminance information illustrated in FIG. 2 is gated from the Y signal by gate 102 in response to the $H_c$ signal. Delay-expander 107 is responsive to the output of gate 102 to delay the information by one line scan time and to time-expand the information by a ratio of five to four. The result is that the center information has an active time of 52.5 microseconds and a bandwidth of 7.5 MHz having been reduced in frequency by four to five from 9.4 MHz. NTSC encoder 108 is responsive to the output of delay-expander block 107 to encode the low-frequency center luminance information and to transmit this information along with the encoded low-frequency center chrominance information from delay-expander blocks 105 and 106, to adder 120. As illustrated in FIG. 3, the output from NTSC encoder 108 is the standard NTSC format and is transmitted in the first TV channel. In the absence of any other input to adder 120, the output of adder 120 is the conventional NTSC signal which when transmitted in the first TV channel is receivable by conventional TV receivers.

The following describes the manner in which the high-frequency luminance information is inserted into the second TV channel. From delay-expander block 107, the high-frequency center luminance information, ranging in frequency from 2.5 MHz to 7.5 MHz, is encoded by Y' encoder 109. The output of Y' encoder 109 is inserted into the active time of the second channel by gate 118 responding to the center control, $G_c$, signal to transmit the output of the Y' encoder 109, via summer 117, to adder 120. FIG. 3 illustrates Y' position within the spectrum of the second channel after insertion of the latter by adder 120.

The edge luminance information illustrated in FIG. 2 consists of a left and a right portion. $Y_e'$ encoder 110 is responsive to the Y signal to delay the Y signal by one horizontal line scan time and to encode the left edge and the right edge luminance information in response to the $H_e$ signal. The resulting $Y_e'$ signal that contains both the left and right edge luminance information is then inserted into the horizontal retrace interval of the second channel by gate 116 responding to the $G_e$ signal and transferred, via summer 117, to adder 120. This results in the $Y_e'$ signal being inserted into the blanking interval of the second channel as illustrated in FIG. 3.

The chrominance information is encoded in the following manner. The center chrominance information is extracted from the I and Q signals by gates 103 and 104 responding to the $H_c$ signal. Delay-expander blocks 105 and 106 respond to the outputs of gates 103 and 104, respectively, to delay the resulting I and Q center information by one horizontal line scan time and to expand this delayed information by a ratio of 5 to 4 resulting in the active time being 52.5 microseconds and the bandwidth being reduced from 9.4 MHz to 7.5 MHz. NTSC encoder 108 is responsive to the outputs of delay-expander blocks 105 and 106 to encode the standard chrominance information into the NTSC format and to transfer the resulting signals to adder 120.

C' encoder 111 is responsive to the high-frequency center chrominance information, in the frequency range from 0.5 to 2 MHz, to encode this information in a manner so that it interleaves the Y' signal in the second channel and to transfer this information in an alternating fashion such that each horizontal line scan interval contains either the I or the Q high-frequency center chrominance information. The resulting signal is then inserted into the second channel as illustrated in FIG. 3. This information is inserted into the active scan time of the second channel by gate 115 responding to the $G_c$ signal and transmitted, via summer 114, to adder 120.

The edge chrominance information illustrated in FIG. 2 consists of a left and right portion. Encoder 112 is responsive to the I and Q signals to delay these signals by one horizontal line scan time and to encode the left and the right edge chrominance information in response to the $H_e$ signal in a manner similar to the encoding function performed by C' encoder 111. $C_e'$ encoder 112 also performs a delay function so that the resulting right edge portion of the $C_e'$ signal can be inserted into the horizontal retrace interval of the second channel via gate 113, summer 114, and adder 120.

Delay-expander 106 delays the gated Q signal by one horizontal line scan time by storing the Q signal for one scan time in a designated one of the charged coupled device memories (CCD) during that scan time and transmitting this stored signal via conductor 123 during the next scan time. During this next scan time, the gated Q signal is stored in the other CCD memory. The time expansion is accomplished by reading from a CCD memory at a slower rate than the rate at which the information was written. Delay-expander 105 and 107 are similar in design to block 106.

Figure 4:
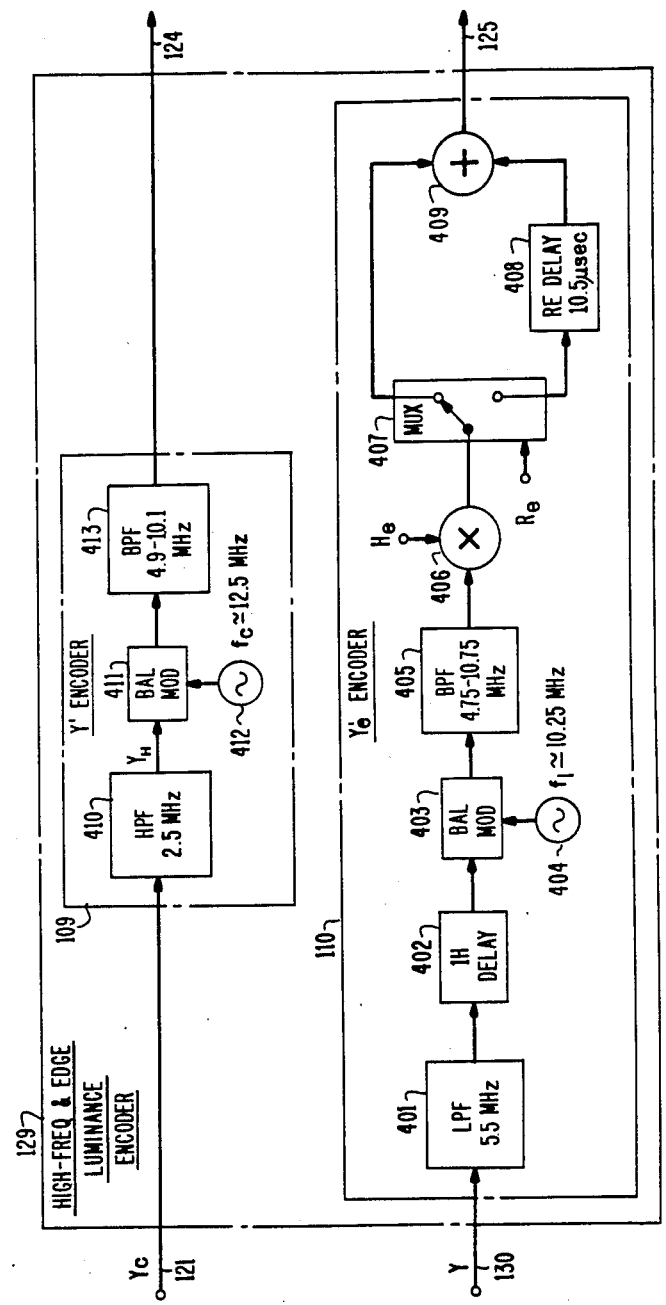
FIG. 4 illustrates in greater detail Y' encoder 109 and $Y_e'$ FIG. 1.

High-frequency and edge luminance encoder 129 is illustrated in greater detail in FIG. 4. Y' encoder 109 comprises elements 410 through 413, and $Y_e'$ encoder 110 comprises elements 401 through 409. The Y' encoder 109 functions in the following manner. High-pass filter 410 is responsive to the $Y_c$ signal transmitted via conductor 121 to eliminate the low-frequency luminance portion of $Y_c$. The output signal of high-pass filter 410 is then translated from its frequency range, that is, from 2.5 to 7.5 MHz, by modulating this output signal with a 12.5 MHz carrier with elements 411 and 412. Band-pass filter 413 is responsive to the resulting signal from modulator 411 to remove a portion of the resulting frequency spectrum from 15 to 20 MHz leaving a single sideband signal ranging in frequency from 5 to 10 MHz. The output signal of band-pass filter 413 is then gated as previously described by gate 118 in response to the $G_c$ signal for insertion into the active time interval in the second channel.

$Y_e'$ encoder 110 functions in the following manner. The Y signal on conductor 130 is first limited in bandwidth by low-pass filter 401 so as to contain frequencies between 0 and 5.5 MHz. The output of low-pass filter 401 is then delayed by one horizontal scan line time by delay 402 so that the luminance information has the same time relationship as the center luminance information. After being delayed, the signal is then translated in frequency by modulator 403 in response to a signal from oscillator 404. The resulting signal from modulator 403 is then filtered by band-pass filter 405 so that the output is a vestigial sideband signal having a frequency range from 4.75 to 10.75 MHz. The center luminance information is then eliminated by gate 406 responding to the $H_e$ signal. Multiplexer 407 selects the left and right edge information. The left information is immediately transferred to summer 409 whereas the right edge information is delayed by 10.5 microseconds by delay 408 so as to properly time position the right edge information for insertion into the blanking time interval in the second channel. The output of summer 409 is then gated by gate 116 under control of the $G_e$ signal before being transmitted by summer 117 to adder 120 and inserted into the $Z_a$ signal illustrated in FIG. 3.

Figure 5:
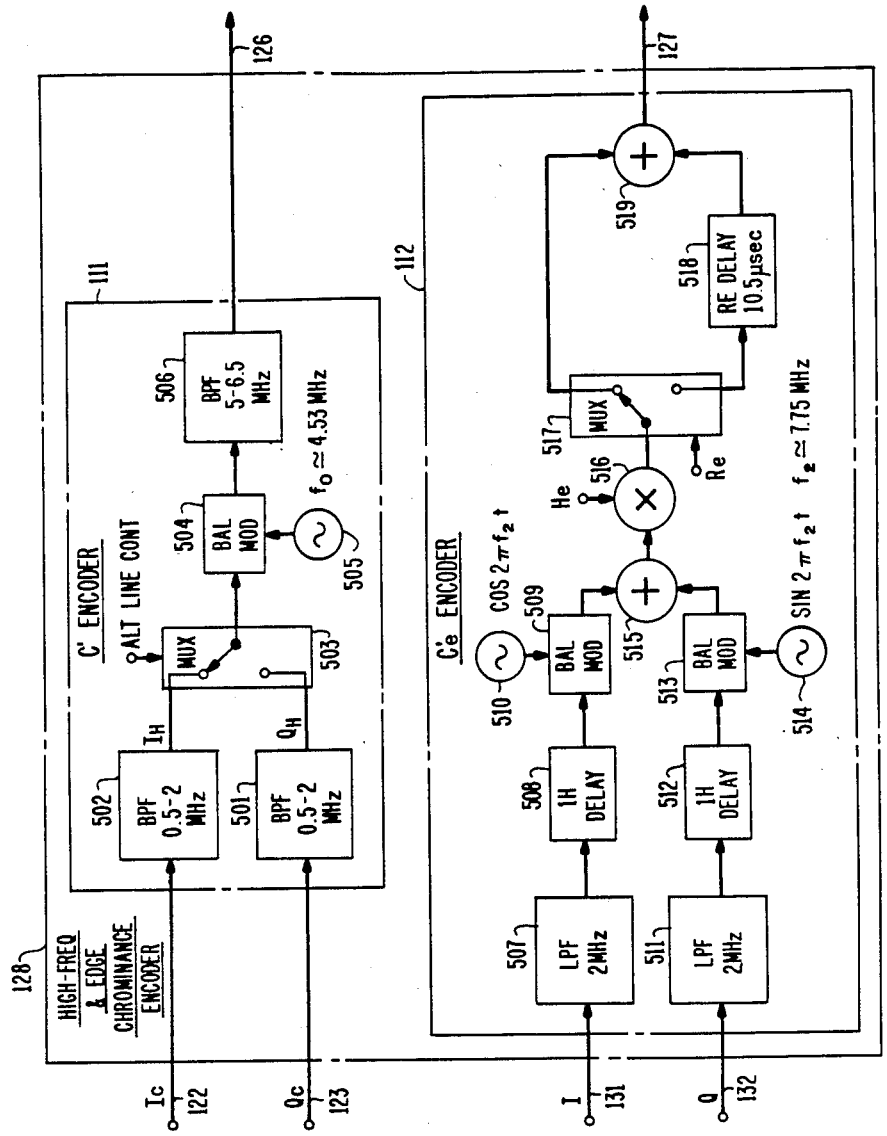
FIG. 5 illustrates in greater detail C' encoder 111 and $C_e'$ encoder 112 of FIG. 1.

High-frequency chrominance and edge encoder 128 is illustrated in greater detail in FIG. 5. C' encoder 111 functions by first band-pass filtering the incoming $I_c$ and $Q_c$ signals resulting in a spectrum from 0.5 to 2.0 MHz by using band-pass filters 502 and 501, respectively. Then the resulting high-frequency chrominance signals, $I_H$ and $Q_H$, are selected by multiplexer 503 so that one or the other signal is transmitted during each active horizontal line scan time to modulator 504. The latter is responsive to the signal from multiplexer 503 and a carrier signal from oscillator 505 to translate the received signal in frequency. The result of this translation is band-pass filtered by band-pass filter 506 to create a single sideband signal having a frequency range from 5.0 to 6.5 MHz that occupies the proper spectrum for insertion into the $Z_a$ signal as illustrated in FIG. 3 for the C' signal. Note, that frequencies $f_c$ and $f_o$ are advantageously chosen such that Y' and C' interleave.

$C_e'$ encoder 112 functions in the following manner. The I and Q signals are first filtered by low-pass filters 507 and 511, respectively, and then delayed by one horizontal line scan time by delays 508 and 512, respectively. A double sideband suppressed carrier quadrature amplitude modulated (AM) signal is then formed by modulators 509 and 513, oscillators 510 and 514, and summer 515. This signal is then gated by gate 516 in response to the $H_e$ signal. In response to the output of gate 516 and the $R_e$ signal, multiplexer 517 selects the left and the right edge with the right edge information being delayed by 10.5 microseconds by delay 518. The left edge information and right edge information are combined by summer 519; and then, inserted into the $Z_a$ signal as represented in FIG. 3 by gate 113 responding to $G_e$, summer 114, and adder 120. Note that frequencies $f_1$ and $f_2$ are advantageously chosen such that $Y_e'$ and $C_e'$ interleave.

Figure 6:
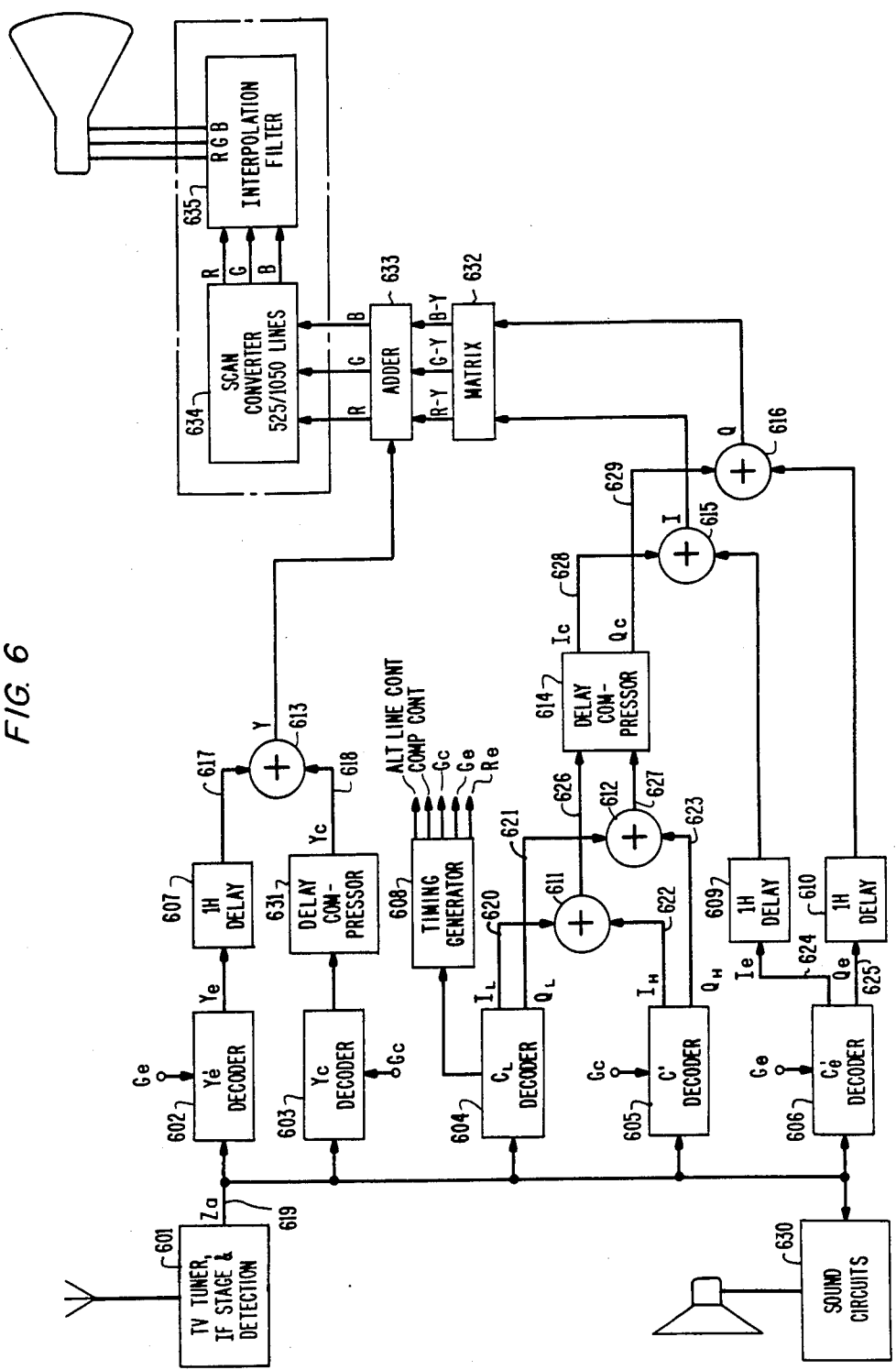
FIG. 6 is a block diagram of the high-definition decoder of our invention.

A decoder for receiving the $Z_a$ signal shown in FIG. 3 is illustrated in FIG. 6. Television (TV) tuner, intermediate frequency (IF) stage and detection block 601 receives the incoming TV signal, i.e., the two TV channels containing the broadband luminance and chrominance information heretofore described. Accordingly, block 601 may contain either a broadband radio frequency (RF) tuner capable of receiving two adjacent TV channels or separate RF tuners each tuned to a respective channel. In either event, the output of block 601 provides the baseband amplitude-frequency characteristic of FIG. 3 with $Y_e'$ and $C_e'$ added to Y' and C', respectively. Block 601 is coupled at its output to circuits 602, 603, 604, 605, 606, and 630. The center luminance signal, $Y_c$, which comprises the low- and high-frequency luminance information, $Y_L$ and $Y_H$, is recovered by $Y_c$ decoder 603 and delay-compressor block 631. $Y_c$ decoder 603 recovers the $Y_L$ and $Y_H$ signals from the luminance portion of the V signal and Y' signal, respectively, of the baseband signal illustrated in FIG. 3, and block 631 provides the necessary time compression and delay to recreate the $Y_c$ signal illustrated in FIG. 2.

The edge luminance signal, $Y_e$, is recovered by $Y_e'$ decoder 602 and delay block 607. Summer 613 adds the delayed $Y_e$ signal and the $Y_c$ signal to produce the Y signal.

The edge chrominance signal is recovered by $C_e'$ decoder 606 and delay circuits 609 and 610 producing the properly aligned $I_e$ and $Q_e$ signals. The high-frequency center chrominance signal is recovered by $C'$ decoder 605 and the low-frequency center chrominance signal is recovered by $C_L$ decoder 604. Decoder 604 is a NTSC decoder with the proper low-pass filtering on its outputs in order to produce the signals $I_L$ and $Q_L$ on conductors 620 and 621, respectively. The $I_L$ and $I_H$ signals are combined by summer 611, and the $Q_L$ and $Q_H$ signals are combined by summer 612. Delay-compressor circuit 614 is responsive to the resulting signals from summers 611 and 612 transmitted via conductors 626 and 627 to delay and time compress these signals so that they are the center chrominance information as illustrated in FIG. 2. Summer 615 is responsive to the $I_c$ and $I_e$ signals to produce the I signal, and summer 616 is responsive to $Q_c$ and $Q_e$ signals to produce the Q signal. Blocks 632 through 635 are responsive to the Y, I, and Q signals to produce the high-definition video picture.

Figure 7:
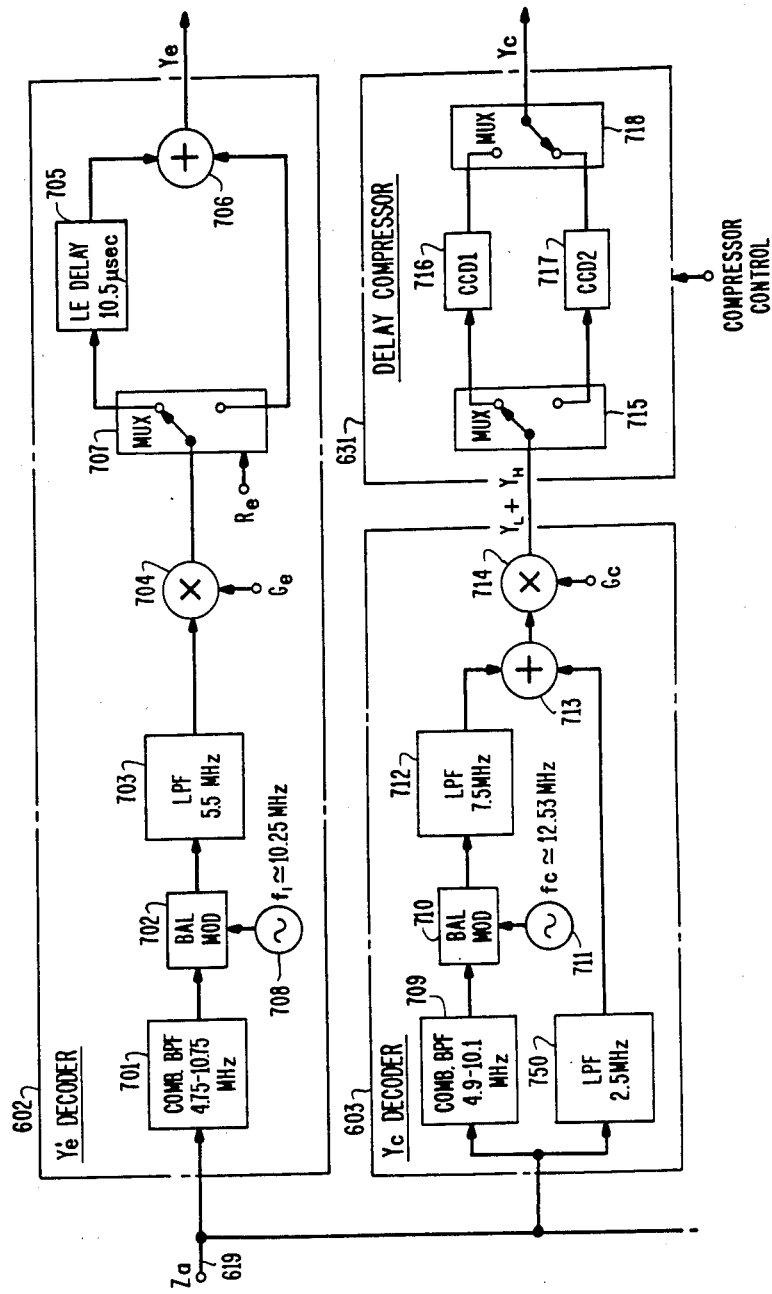
FIG. 7 illustrates in greater detail $Y_e'$ decoder 602, $Y_c$ decoder 603, and delay-compressor 631 of FIG. 6.

$Y_e'$ decoder 602 is illustrated in greater detail in FIG. 7. The $Z_a$ signal on conductor 619 is first band-pass filtered by filter 701 to retain only the upper 6 MHz portion of the signal and to comb out the chrominance edges that fall in the range of 5.75 to 9.75 MHz. The output of filter 701 is the $Y_e'$ signal plus the center high-frequency luminance signal. This output is then modulated down to baseband utilizing modulator 702. The latter is responsive to the output of filter 701 and oscillator 708. The latter generates a 10.25 MHz signal. The output of modulator 702 is then passed through low-pass filter 703 so that only frequencies from 0 to 5.5 MHz are retained. The center signal is removed by gate 704 responding to the $G_e$ signal. Multiplexer 707 then is responsive to the $R_e$ signal to transmit the right edge portion of the $Y_e$ signal directly to summer 706 and to transmit the left edge information of $Y_e$ through delay circuit 705 which delays the left edge information by 10.5 microseconds. This delay positions the left edge information for display. Summer 706 then combines these two portions together to form the $Y_e$ signal which is encoded as $Y_e'$ in FIG. 3.

$Y_c$ decoder 6u3 and delay-compressor 631 are also illustrated in greater detail in FIG. 7. The high-frequency center luminance signal is extracted from $Z_a$ by filter 709, modulator 710, oscillator 711, and low-pass filter 712. The low-frequency center information, $Y_L$, is extracted by low-pass filter 750. The two center luminance signals which contain extraneous edge information are then combined by summer 713. The output of summer 713 then has the extraneous edge information removed by gate 714 being responsive to the $G_c$ signal. The output of gate 714 is the signals $Y_L$ and $Y_H$. This summation signal of $Y_L$ and $Y_H$ is then time compressed and delayed by delay-compressor 631 to produce the center luminance signal $Y_c$. Delay-compressor 631 functions by multiplexer 715 loading either charge-coupled device (CCD) memory 716 or 717 when multiplexer 718 is extracting information from the other CCD memory. This results in the summation of the signals $Y_L$ and $Y_H$ being time compressed and delayed by one horizontal scan line time.

Figure 8:
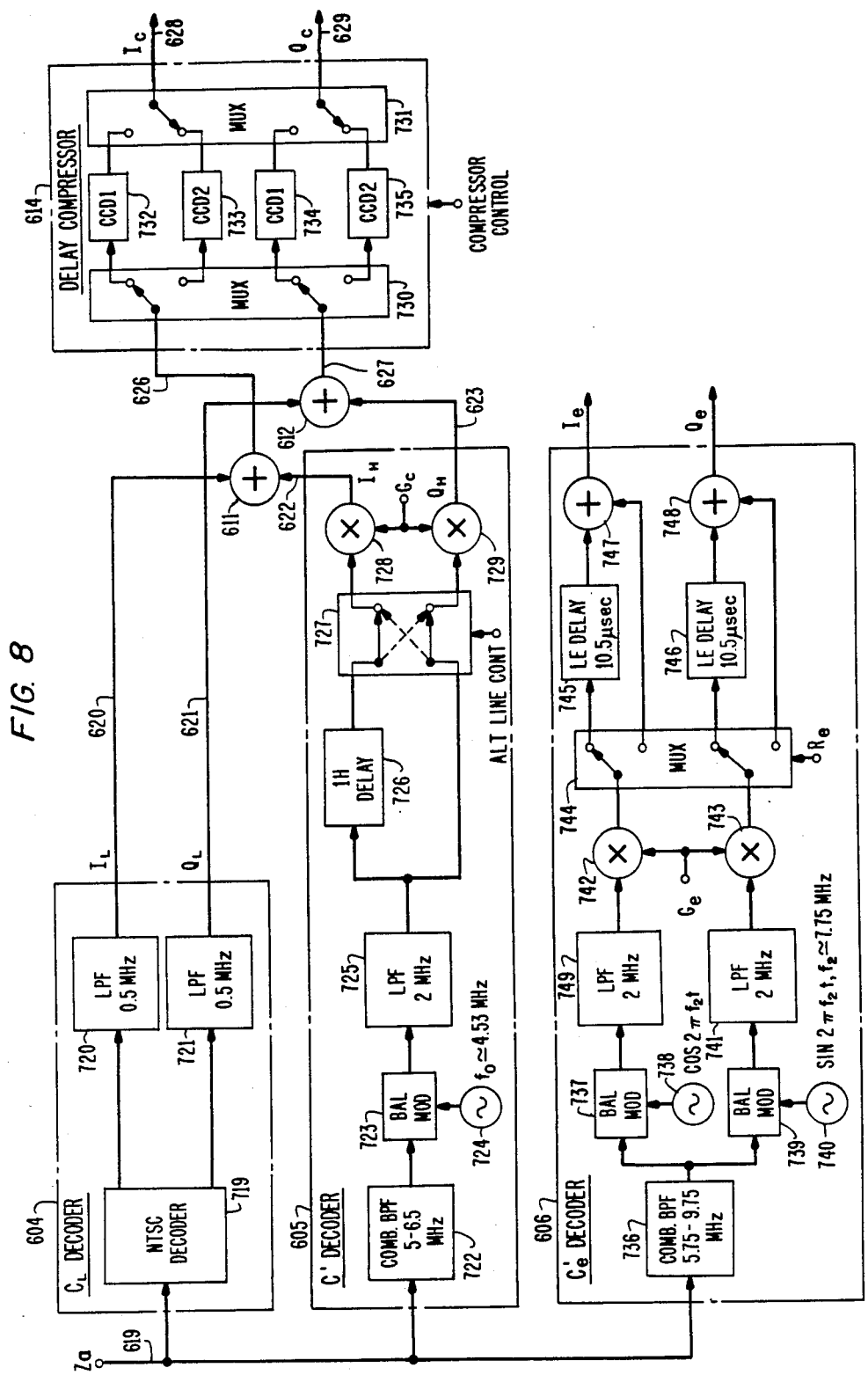
FIG. 8 illustrates in greater detail $C_L$ decoder 604, C' decoder 605, $C_e'$ decoder 606, and delay-compressor 614.

$C_L$ decoder 604 is shown in greater detail in FIG. 8. As can be seen from FIG. 8, decoder 604 comprises NTSC decoder 719 and low-pass filters 720 and 721. Decoder 719 operates in the conventional manner to extract the chrominance information from the first channel.

C' decoder 605 is illustrated in greater detail in FIG. 8. Comb band-pass filter 722 removes the Y' and $Y_e'$ signals before transmitting the chrominance information to modulator 723. Modulator 723 provides a frequency translation function by modulating the chrominance information into the proper frequency band of 0.5 to 2.0 MHz. The modulator also translates the chrominance information up by $f_o$ but these signals are removed by filter 725. The output of filter 725 includes the $C_H$ signal which alternately comprises the $I_H$ and $Q_H$ signals. Since the $I_H$ and $Q_H$ signals are being alternately transmitted, it is necessary to store one signal from a previous line and reuse it on the present line in order to obtain the desired information. Delay line circuit 726 performs this storage function. Multiplexer 727 is responsive to the alternate line control signal from timing generator 608 (is shown in FIG. 6) to alternate between the output of band-pass filter 725 and the output of delay line 726 so that the information for the $Q_H$ and $I_H$ signals is continuous for gates 729 and 728, respectively. The resulting signals from multiplexer 727 are communicated by gases 729 and 728 in response to the $G_c$ signal from timing generator 608 during the active time to summer circuits 612 and 611, respectively.

$C_e'$ decoder 606 is illustrated in greater detail in FIG. 8. Filter 736 is responsive to the $Z_a$ signal to remove the edge and center luminance information. Synchronous quadrature AM demodulators 737 and 739, in response to signals from oscillators 738 and 740, respectively, are utilized to extract the baseband edge chrominance signal plus extraneous center chrominance signals. The center chrominance information is then removed after filtering by low-pass filters 749 and 741 and gating by gates 742 and 743 in response to the $G_c$ signal to generate the components of the $I_e$ and $Q_e$ signals. These components are first multiplexed and delayed by multiplexer 744 and delay blocks 745 and 746 before being combined by summers 747 and 748 to produce $I_e$ and $Q_e$ signals, respectively.

Delay-compressor circuit 614 is illustrated in greater detail in FIG. 8. Multiplexer 730 is utilized to properly write into the CCD memories 732, 733, 734, and 735 in order to time compress and to assure that the $I_c$ and $Q_c$ components have the proper time compression and delay. Multiplexer 731 is then used to extract the information from the CCD memories.

Figure 9:
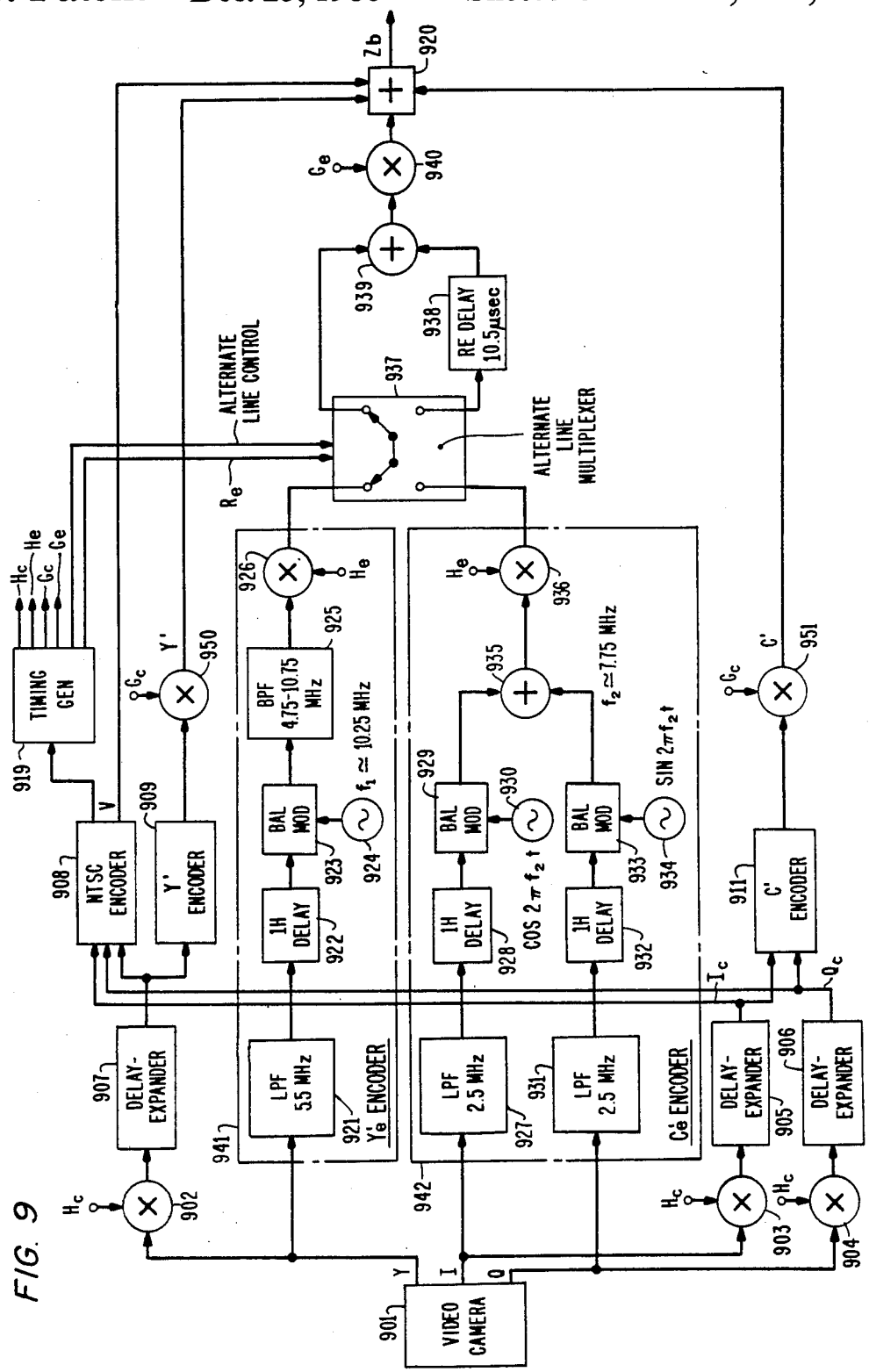
FIG. 9 is a block diagram of another embodiment of a high-definition encoder of our invention.
Figure 10:
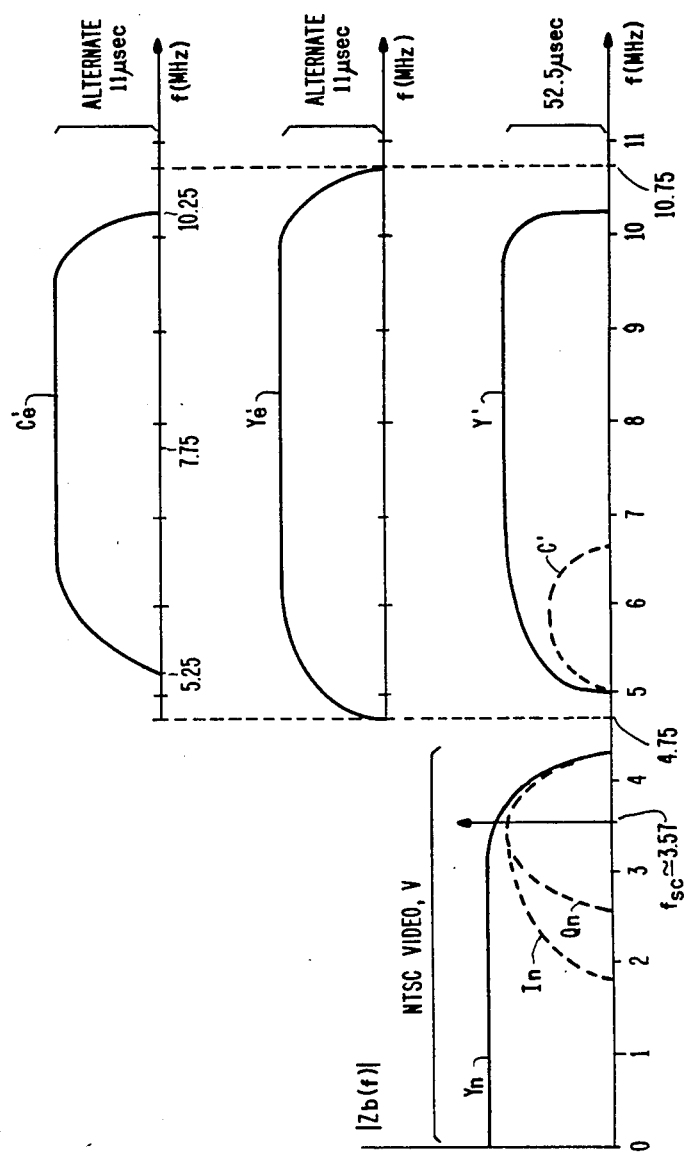
FIG. 10 shows the composite baseband amplitude-frequency characteristics of the signal generated by the encoder of FIG. 9.

Another embodiment of our invention makes it possible to eliminate crosstalk between the luminance edge information, $Y_e$, and the chrominance edge information, $C_e$. An encoder for accomplishing this is illustrated in FIG. 9. This encoder functions by transmitting $Y_e'$ and $C_e'$ in the horizontal retrace interval of the second TV channel on alternate horizontal lines. The resulting $Z_b$ signal is illustrated in FIG. 10. Blocks 901 through 909, 911, 919, 950, and 951 perform the same functions as previously described with respect to FIG. 1. Elements 921 through 926 of $Y_e'$ encoder 941 encode the edge luminance component in a manner similar to that performed by the corresponding elements of $Y_e'$ encoder 110 illustrated in detail in FIG. 4. Similarly, the edge chrominance components are encoded by elements 927 through 936 of $C_e'$ encoder 942 in a manner similar to that done by the elements of the $C_e'$ encoder 112 as illustrated in FIG. 5. Here, the edge chrominance bandwidth is illustratively shown as 2.5 MHz to increase the horizontal edge chrominance resolution. Such an increase could also be employed in the $C_e'$ encoder in FIG. 5. Alternate line multiplexer 937 alternately selects the output of encoder 941 or 942 on alternate lines for transmission. In addition, the alternate line multiplexer 927 sends its output directly to summer 939 when the output of encoder 941 is being selected as the left edge information. When the right edge information is being selected, alternate line multiplexer 937 transmits this information to right edge delay 938 so that the right edge information can be delayed by 10.5 microseconds. The output of summer 939 is transferred to gate 940. The latter only transmits the information to 920 in response to the $G_e$ signal that occurs during the horizontal retrace interval in the second channel.

Figure 11:
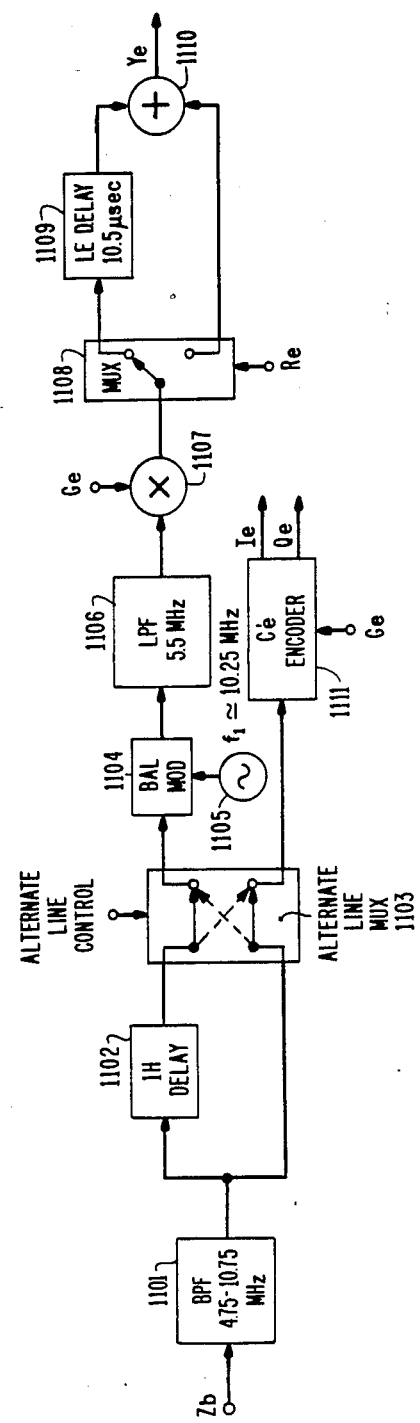
FIG. 11 is a block diagram of another embodiment of a high-definition decoder of our invention, responsive to $Z_b$ of FIG. 10.

FIG. 11 illustrates the changes that must be made to FIG. 6 in order to properly decode the $Z_b$ signal illustrated in FIG. 10. Elements 602 and 606 of FIG. 6 are replaced by the elements of FIG. 11. $C_e'$ decoder 1111 is similar in design to $C_e'$ decoder 606 of FIG. 6. Decoder 1111 differs from decoder 606 in that the filter in decoder 1111 analogous to filter 736 is not a combed filter and has a pass-band from 5.25 MHz to 10.25 MHz, and the filters analogous to filters 741 and 749 have a cutoff frequency of 2.5 MHz. Decoder 1111 is responsive to the output of alternate line multiplexer 1103 to switch between the present horizontal line information coming from filter 1101 and the previous horizontal line information stored in delay 1102 to provide a continuous output to decoder 1111 and low-pass filter 1106. Filter 1101 is similar in design to filter 701 of FIG. 7. In addition, elements 1104 through 1110 are identical in design and function to similar elements illustrated in FIG. 7 for $Y_e'$ decoder 602. The alternate line multiplexer 1103 is responsive to an alternate line control signal from generator 608 as illustrated in FIG. 6 to provide a continuous input signal to modulator 1104 by switching back and forth between the present and the previous line.

While the illustrated embodiments of our invention have been described specifically with relation to NTSC standards and protocols, it is to be understood that the principles of our invention are applicable to other standards and protocols, such as the phase alternation line (PAL) system. Furthermore, the circuits and amplitude-characteristics that have been described are deemed to be illustrative of the principles of our invention. Numerous modifications may be made by those skilled in the art without departing from the spirit and scope of our invention.

What is claimed is:

1. A system for encoding high-definition luminance and chrominance information from a high-definition video source having low-frequency chrominance and luminance information and high-frequency luminance and chrominance information and extended aspect ratio luminance and chrominance information, said system comprises means for gating said low-frequency and high-frequency luminance and chrominance information from said high-definition luminance and chrominance information;

means for time expanding the gated low-frequency and high-frequency luminance and chrominance information;

means for encoding the time expanded low-frequency luminance and chrominance information into a first baseband signal;

means for encoding the expanded high-frequency luminance and chrominance information into a second baseband signal;

means for separating said extended aspect ratio luminance and chrominance information from said high-definition luminance and chrominance information;

means for encoding the separated extended aspect ratio luminance and chrominance information into the horizontal retrace interval of said second baseband signal; and means for transmitting said first baseband signal and said second baseband signal.

2. The system of claim 1 further comprises means for generating a middle control signal during the time that said low-frequency and high-frequency chrominance and luminance information is present in said high-definition luminance and chrominance information; and said low-frequency and high-frequency luminance and chrominance information gating means responsive to said middle control signal for gating said low-frequency and high-frequency luminance and chrominance information from said high-definition luminance and chrominance information.

3. The system of claim 2 further comprises means for generating a center signal during the active horizontal line time of said first baseband signal and means for generating an edge signal during said horizontal retrace time of said first baseband signal;

said transmitting means comprises means responsive to said center signal for transmitting said low-frequency and high-frequency luminance and chrominance information; and means responsive to said edge signal for transmitting the encoded extended aspect ratio luminance and chrominance information to said transmitting means.

4. The system of claim 3 wherein said high-frequency luminance and chrominance encoding means further comprises means responsive to said gated high-frequency luminance information for modulating said gated high-frequency luminance information with a signal having a frequency that is a multiple of the frequency of the chrominance subcarrier embedded in said first baseband signal to produce a single sideband signal having spectra that do not overlap the spectra of said first baseband signal.

5. The system of claim 4 wherein said high-frequency luminance and chrominance encoding means further comprises means for multiplexing between successive horizontal lines of said high-frequency chrominance information; and means for modulating the multiplexed high-frequency chrominance information with a signal which is a multiple of the line scanning rate to provide a single sideband color spectrum that non-interferingly interleaves the high-frequency luminance spectra of said produced single sideband signal.

6. The system of claim 5 wherein said extended aspect ratio chrominance information comprises two portions and said extended aspect ratio luminance and chrominance encoding means further comprises means for quadrature amplitude modulating said two extended aspect ratio chrominance portions with a signal having a frequency that is a multiple of the frequency of said horizontal line scanning rate to produce another sideband signal having spectra that do not overlap the spectra of said first baseband signal.

7. The system of claim 6 wherein said extended aspect ratio luminance and chrominance information comprises a left segment and a right segment and said extended aspect ratio luminance and chrominance information encoding means further comprises means for delaying said right segment of said extended aspect ratio luminance and chrominance information by a delay proportional to the expansion of said low-frequency and high-frequency luminance and chrominance information by said expanding means.

8. A system for decoding high-definition information of a high-definition baseband video signal having a first baseband signal including low-frequency luminance and chrominance information and a second baseband signal including high-frequency luminance and chrominance information and band-limited edge luminance and chrominance information in the horizontal retrace interval of said second baseband signal to provide extended aspect ratio information, said system comprises
   means for decoding said low-frequency and high-frequency luminance information;
   means for time compressing the decoded low-frequency and high-frequency luminance information;
   means for decoding said band-limited edge luminance information;
   means for combining the compressed low-frequency and high-frequency luminance information and the decoded band-limited edge luminance information for display;
   means for decoding said low-frequency chrominance information;
   means for decoding said high-frequency chrominance information;
   means for combining the decoded low-frequency chrominance information and the decoded high-frequency chrominance information;
   means for time compressing the combined low-frequency and high-frequency chrominance information;
   means for decoding said band-limited edge chrominance information; and
   means for adding the time compressed low-frequency chrominance information and high-frequency chrominance information and the decoded band-limited edge chrominance information for display.

9. The system of claim 8 wherein said band-limited edge luminance information comprises a left segment and a right segment and said band-limited edge luminance information decoding means comprises means for delaying said left segment of said band-limited edge luminance information by a delay proportional to the compression of said low-frequency and high-frequency luminance information by said luminance compressing means.

10. The system of claim 8 wherein said band-limited edge chrominance information comprises a left segment and a right segment and said band-limited edge chrominance information decoding means comprises means for delaying said left segment of said band-limited edge chrominance information by a delay proportional to the compression of said low-frequency and high-frequency luminance information by said luminance compressing means.

11. The system of claim 10 wherein said band-limited edge chrominance information decoding means further comprises means for quadrature amplitude demodulating said band-limited edge chrominance information into two types of band-limited edge chrominance information.

12. The system of claim 8 wherein said high-frequency chrominance information comprises a first and a second type of chrominance information in alternate horizontal intervals, and said high-frequency chrominance information decoding means comprises
   means for storing said first type of chrominance information during a first horizontal interval;
   means for reading said first type of chrominance information from said storing means during a second horizontal interval;
   means for receiving said second type of chrominance information during said second horizontal interval; and
   means for multiplexing said read first type of chrominance information and the received second type of chrominance information for transmission to said chrominance adding means for display.

13. The system of claim 11 further comprises means for generating an edge signal during the horizontal retrace time of said first baseband signal; and
   said quadrature amplitude demodulating means comprises means responsive to said edge signal for gating the demodulated band-limited edge chrominance information to said delaying means.

14. A system for encoding high-definition luminance and chrominance information from a high-definition video source having low-frequency chrominance and luminance information and high-frequency luminance and chrominance information and extended aspect ratio luminance and chrominance information, said system comprises
   means for gating said low-frequency and high-frequency luminance and chrominance information from said high-definition luminance and chrominance information;
   means for time expanding the gated low-frequency and high-frequency luminance and chrominance information;
   means for encoding the time expanded low-frequency luminance and chrominance information into a first baseband signal;
   means for encoding the expanded high-frequency luminance and chrominance information into a second baseband signal;
   means for separating said extended aspect ratio luminance and chrominance information from said high-definition luminance and chrominance information;
   means for multiplexing said extended aspect ratio luminance information and said extended aspect ratio chrominance information alternately between successive horizontal lines of high-definition luminance and chrominance information;
   means for gating the multiplexed extended aspect ratio luminance and chrominance information into the horizontal retrace interval of said second baseband signals; and means for transmitting said first baseband signal and said second baseband signal.

15. The system of claim 14 further comprises means for generating a middle control signal during the time that said low-frequency and high-frequency chrominance and luminance information are present in said high-definition luminance and chrominance information; and said low-frequency and high-frequency information gating means responsive to said middle control signal for gating said low-frequency and high-frequency luminance and chrominance information from said high-definition luminance and chrominance information.

16. The system of claim 15 further comprises means for generating a center signal during the active horizontal line time of said first baseband signal and means for generating an edge signal during said horizontal retrace time of said first baseband signal;

said transmitting means comprises means responsive to said center signal for transmitting said encoded low-frequency and high-frequency luminance and chrominance information; and means responsive to said edge signal for transmitting said multiplexed extended aspect ratio luminance and chrominance information.

17. The system of claim 14 wherein said extended aspect ratio chrominance information comprises two portions and said multiplexing means further comprises means for quadrature amplitude modulating said two extended aspect ratio chrominance portions with a signal having a frequency that is a multiple of said horizontal line scanning rate to produce a double sideband signal having spectra that do not overlap the spectra of said first baseband signal.

18. The system of claim 17 wherein said extended aspect ratio luminance and chrominance information comprises a left segment and a right segment and said multiplexing means further comprises means for delaying said right segment of said extended aspect ratio luminance and chrominance information by a delay proportional to the expansion of said low-frequency and high-frequency luminance and chrominance information by said expanding means.

19. A system for decoding high-definition information of a high-definition baseband video signal having a first baseband signal including low-frequency luminance and chrominance information and a second baseband signal including high-frequency luminance and band-limited edge luminance and band-limited edge chrominance information alternately transmitted in the horizontal retrace interval of said second baseband signal to provide extended aspect ratio information, the said system comprises means for decoding said low-frequency and high-frequency luminance information;

means for time compressing said low-frequency and high-frequency luminance information;

means for decoding said band-limited edge luminance information in alternate horizontal retrace intervals of said second baseband signal;

means for combining the compressed low-frequency and high-frequency luminance information and the decoded band-limited edge luminance information for display;

means for decoding said low-frequency chrominance information;

means for decoding said high-frequency chrominance information;

means for combining the decoded low-frequency chrominance information and the decoded high-frequency chrominance information;

means for time compressing the combined low-frequency and high-frequency chrominance information;

means for decoding said band-limited edge chrominance information in alternate horizontal retrace intervals of said second baseband signal; and means for adding the time compressed low-frequency chrominance information and the high-frequency chrominance information and the decoded band-limited edge chrominance information for display.

20. The system of claim 19 wherein said band-limited edge luminance information comprises a left segment and a right segment and said band-limited edge luminance information decoding means comprises means for delaying said left segment of said band-limited edge luminance information by a delay proportional to the compression of said low-frequency and high-frequency luminance information by said luminance compressing means.

21. The system of claim 19 wherein said band-limited edge chrominance information comprises a left segment and a right segment and said band-limited edge chrominance information decoding means comprises means for delaying said left segment of said band-limited edge chrominance information by a delay proportional to the compression of said low-frequency and high-frequency luminance by said luminance compressing means.

22. The system of claim 21 wherein said band-limited edge chrominance information decoding means further comprises means for quadrature amplitude demodulating said band-limited edge chrominance information into two types of band-limited edge chrominance information.

23. The system of claim 19 wherein said high-frequency chrominance information comprises a first and a second type of chrominance information in alternate horizontal intervals, and said high-frequency chrominance information decoding means comprises means for storing said first type of chrominance information during a first horizontal interval;

means for reading said first type of chrominance information from said storing means during a second horizontal interval;

means for receiving said second type of chrominance information during said second horizontal interval; and means for multiplexing said read first type of chrominance information and the received second type of chrominance information for transmission to said combining means.

* * * * *